March 15, 1938.    W. H. MARTIN    2,111,027
CONNECTER FOR AN ELECTRICITY AND FLUID CONDUCTOR
Filed Aug. 27, 1936
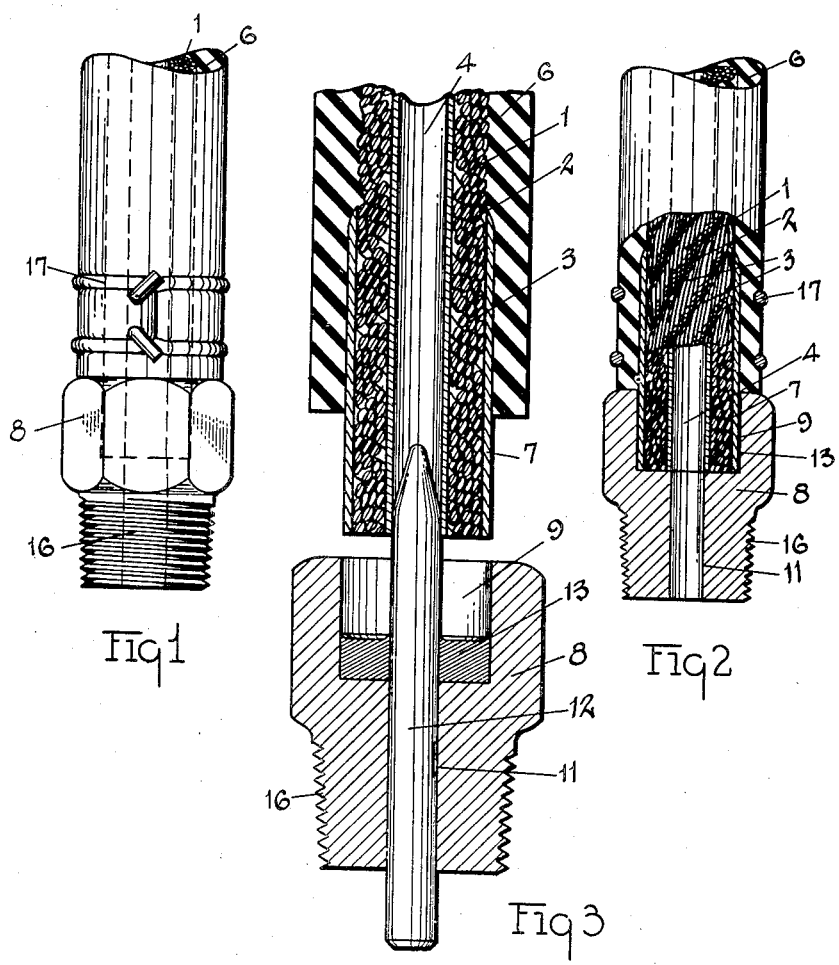
Inventor
William H. Martin
By [signature]
Attorney Patented Mar. 15, 1938

2,111,027

UNITED STATES PATENT OFFICE 2,111,027

CONNECTER FOR AN ELECTRICITY AND FLUID CONDUCTOR

William H. Martin, Detroit, Mich.

Application August 27, 1936, Serial No. 98,185

1 Claim. (Cl. 173—353)

My invention has for its object to provide a fluid conductive electric cable terminal. The invention particularly relates to connecters for connecting electric cables to parts of an electrical apparatus or device for conducting large currents which require forced cooling to prevent excess heat losses.

In some forms of combined electric and fluid conductors, flexible thin wall pipes are located within woven or twisted strands having a plurality of wires. The cable is surrounded by suitable electrical insulating material, such as rubber. To establish fluid and electric connection with a part of an apparatus, a free passageway of the fluid flow through the pipe and the part to which it is connected must be established and low contact resistance must be made intermediate the wire and the part of the apparatus. By my invention I have provided a means whereby the fluid and electric connection may be readily established.

Fig. 1 illustrates a side view of the connecter and the cable connected and ready for use. Fig. 2 illustrates a view of a section of the structure shown in Fig. 1. Fig. 3 illustrates certain parts in relative displaced positions to indicate the method of producing the connection between the parts.

The cable 1 comprises the inter-twisted wires 2 that are formed into strands 3 that are similarly twisted to form a rope-like flexible cable of the small wires for conducting large current quantities. The strands are disposed about a thin walled flexible pipe 4 that extends throughout the length of the cable. The cable is surrounded by an insulating material 6 such as rubber that is molded on to the wires. The end of the cable is provided with a metal sleeve, such as the sleeve 7 that surrounds and tightly binds the wires. The sleeve 7 is surrounded by the insulating rubber 6. If desired, the cable may be cut and the sleeve 7 may be pressed up between the wire strands and the rubber insulation. The sleeve 7 operates to hold the small wires that form the cable in their respective positions.

Preparatory to connecting the cable with a connecter, end portions of the rubber 6 are cut away from the surface of the sleeve 7. The connecter 8 has a recess or socket 9 and an axially extending opening 11 having a diameter the same as that of the pipe 4. An aluminum rod 12 fitting the opening 11 and the end of the pipe 4 is inserted through the connecter 8 and into the end of the pipe. Molten solder 13 is placed in the bottom of the socket 9 and while still in a molten state, the end part of the cable is pressed down into the socket. The solder flows about the exterior surface of the pipe, through the interstices of the wires of the cable, the interior surface of the sleeve 7, and intermediate the exterior surface of the sleeve 7 and the interior surface of the socket 9. When the solder has hardened the electrical connection is established. Also, the aluminum rod 12 may be withdrawn from the connecter and the pipe leaving a passageway for free fluid flow through the pipe 4 and the connecter 8.

The connecter may be provided with a threaded part 16 whereby a connection may be established with a part of an apparatus in which large currents are used. If the sleeve is forced between the wires and the sleeve, the insulation rubber 6 may be tightly secured to the sleeve 7 by means of a wire binder 17.

I claim:

An electric and fluid connecter, a conductor having a plurality of externally insulated flexible strands and a centrally located fluid passageway, the connecter having a fluid passageway therethrough, in axial registration with the passageway of the connecter and a socket located in an end part of the connecter, a sleeve located intermediate the exterior insulation and the strands of the conductor and protruding from the end of the insulation substantially the depth of the socket and having an end part located in the socket in substantially abutting relation with the bottom of the socket and in fitting relation to the side surfaces of the socket, solder filling the spaces intermediate parts of the contiguous strands and the sleeve located in the socket and the bottom and side surfaces of the socket for securing and electrically connecting the connecter to the conductor and maintaining continuity of the fluid passageways through the connecter and the conductor.

WILLIAM H. MARTIN.